(12) United States Patent
Son

(10) Patent No.: US 7,502,069 B2
(45) Date of Patent: Mar. 10, 2009

(54) CAMCORDER HAVING A KNOB FOR MODE CHANGING

(75) Inventor: Hyeong Sam Son, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 11/201,195

(22) Filed: Aug. 11, 2005

(65) Prior Publication Data

US 2006/0170818 A1 Aug. 3, 2006

(30) Foreign Application Priority Data

Jan. 28, 2005 (KR) .................. 10-2005-0008143

(51) Int. Cl.
*H04N 5/225* (2006.01)
(52) U.S. Cl. .................. 348/373; 348/374; 348/376; 116/213; 116/309; 396/299
(58) Field of Classification Search .................. 348/373, 348/374, 376; 200/4, 5, 11; 116/4, 5, 309; 396/299
See application file for complete search history.

(56) References Cited

U.S. PATENT DOCUMENTS

| | | | | |
|---|---|---|---|---|
| 4,659,881 A | * | 4/1987 | Dowe | .................. 200/5 R |
| 5,089,677 A | * | 2/1992 | Satou | .................. 200/339 |
| 6,610,937 B2 | * | 8/2003 | Yamaguchi | .................. 200/4 |
| 6,621,016 B2 | | 9/2003 | Ohba et al. | |
| 6,680,444 B1 | * | 1/2004 | Lee | .................. 200/4 |
| 6,784,384 B2 | * | 8/2004 | Park et al. | .................. 200/11 R |

FOREIGN PATENT DOCUMENTS

| KR | 20-0121694 | 8/1994 |
|---|---|---|
| KR | 20-1996-035369 | 11/1996 |
| KR | 100228692 B1 | 8/1999 |
| KR | 100228694 B1 | 8/1999 |

* cited by examiner

*Primary Examiner*—Ngoc-Yen T Vu
*Assistant Examiner*—Quang V Le
(74) *Attorney, Agent, or Firm*—Roylance, Abrams, Berdo & Goodman, L.L.P.

(57) ABSTRACT

A minimized camcorder including a knob for a mode-changing device. The camcorder includes a knob rotatably installed on a case. A knob holder is provided for holding the knob on the inside of the case to prevent the knob from separating from the case. A plate spring is installed inside the case and has locking swells to provide tactile feedback. A ring plate rotates together with the knob holder and has locking parts formed with a plurality of holes into which the locking swells are locked.

20 Claims, 5 Drawing Sheets

CAMCORDER HAVING A KNOB FOR MODE CHANGING

CROSS-REFERENCE TO RELATED APPLICATION

This application claims the benefit under 35 U.S.C. § 119 (a) of Korean Patent Application No. 2005-8143, filed on Jan. 28, 2005, the entire disclosure of which is hereby incorporated by reference.

BACKGROUND OF THE INVENTION

1. Field of the Invention

The present invention relates to a camcorder. More particularly, the present invention relates to a mode-changing device used for a changing operation mode of the camcorder.

2. Description of the Related Art

A camcorder is a device typically used for recording a moving picture on tape by shooting moving object(s) for reproducing the recorded moving picture. The camcorder is being widely popularized due to increasingly lower prices and higher performance.

The camcorder is generally operated in two modes, a shooting mode for shooting images and a reproducing mode for reproducing the stored images. The camcorder includes a mode-changing device for changing between the shooting or reproducing modes. The mode-changing device includes a knob that is installed on the outside of a case for rotating a certain degree. The mode of the camcorder rotatably changes to the shooting mode or the reproducing mode by rotation of the knob.

Examples of conventional mode-changing devices are disclosed in Korean Patent Laid-Open No. 1999-0008792, Korean Utility Model Registration No. 130269, and U.S. Pat. No. 6,621,016.

The mode-changing devices disclosed in the above-referenced documents have the following disadvantages.

First, since many of the components are installed between the knob and the case of the camcorder, it is relatively difficult to minimize the size of the camcorder and tactile feedback is poor.

Second, since the mode-changing devices are relatively complex, molds for fabricating the mode-changing devices are also complicated, and as a result, manufacturing productivity decreases.

Lastly, switching operations for changing modes is not smooth and assembly of the mode-changing devices is also relatively complicated.

Accordingly, there is a need for a relatively small camcorder with a knob configured for improving tactile feedback.

SUMMARY OF THE INVENTION

An aspect of the present invention is to solve at least the above problems and/or disadvantages and to provide at least the advantages described below. Accordingly, an aspect of the present invention is to provide a camcorder with a knob for a mode-changing device that improves tactile feedback, while minimizing the size of the camcorder.

It is another object of the present invention to provide a camcorder with a relatively simple mode-changing device which may be easily manufactured to enhance production thereof.

It is yet another object of the present invention to provide a camcorder having a relatively smooth switching operation for changing modes.

The foregoing objects are attained by a providing a camcorder including a knob rotatably installed on a case. A knob holder holds the knob on the inside of the case to prevent the knob from separating from the case. A plate spring is installed inside the case and has locking swells to provide tactile feedback. A ring plate rotates together with the knob holder and has locking parts with a plurality of holes into which the locking swells are locked.

Preferably, the camcorder further includes a locker for restricting the rotation of the knob, and a locker spring for returning the locker to its original position.

The locker may include a pressing protrusion that is installed on the knob to move forward and backward.

The locker spring may also include a compression coil spring.

The knob may further include a coupler that protrudes from the inner central portion of the knob and couples the knob with the knob holder. The knob holder has an accommodating groove having a shape corresponding to the shape of the coupler. The knob and the knob holder are coupled with each other by fitting the coupler into the accommodating groove.

The knob holder preferably includes two switch operators that are provided inside the case and operate switches. The switch operators have plates that directly contact the switches.

The case may include coupling protrusions that are formed in the inner surface of the case and fix the plate spring. The plate spring preferably has insertion holes into which the coupling protrusions are inserted.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for conciseness.

Figure 1:
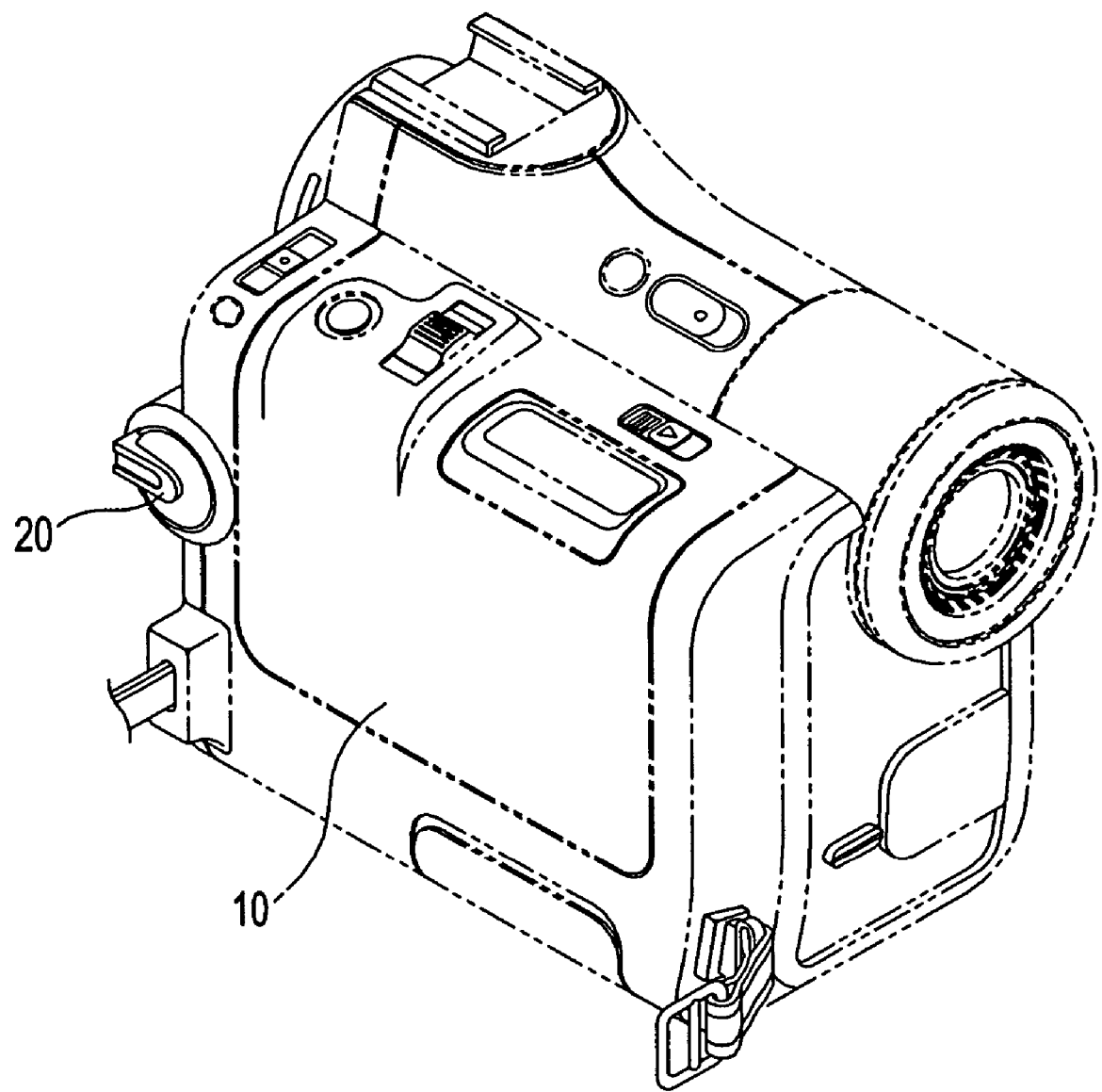
FIG. 1 is a perspective view illustrating a camcorder in accordance with an embodiment of the present invention.

As shown in FIG. 1, the camcorder in accordance with the exemplary embodiment of the present invention includes a knob device installed on the rear side of a case 10 to change modes of the camcorder. Preferably, the knob device is installed so that a user's thumb is positioned on the knob device when the user holds the camcorder with the right hand. Thus, it is convenient for the user to manipulate the knob device.

Figure 2:
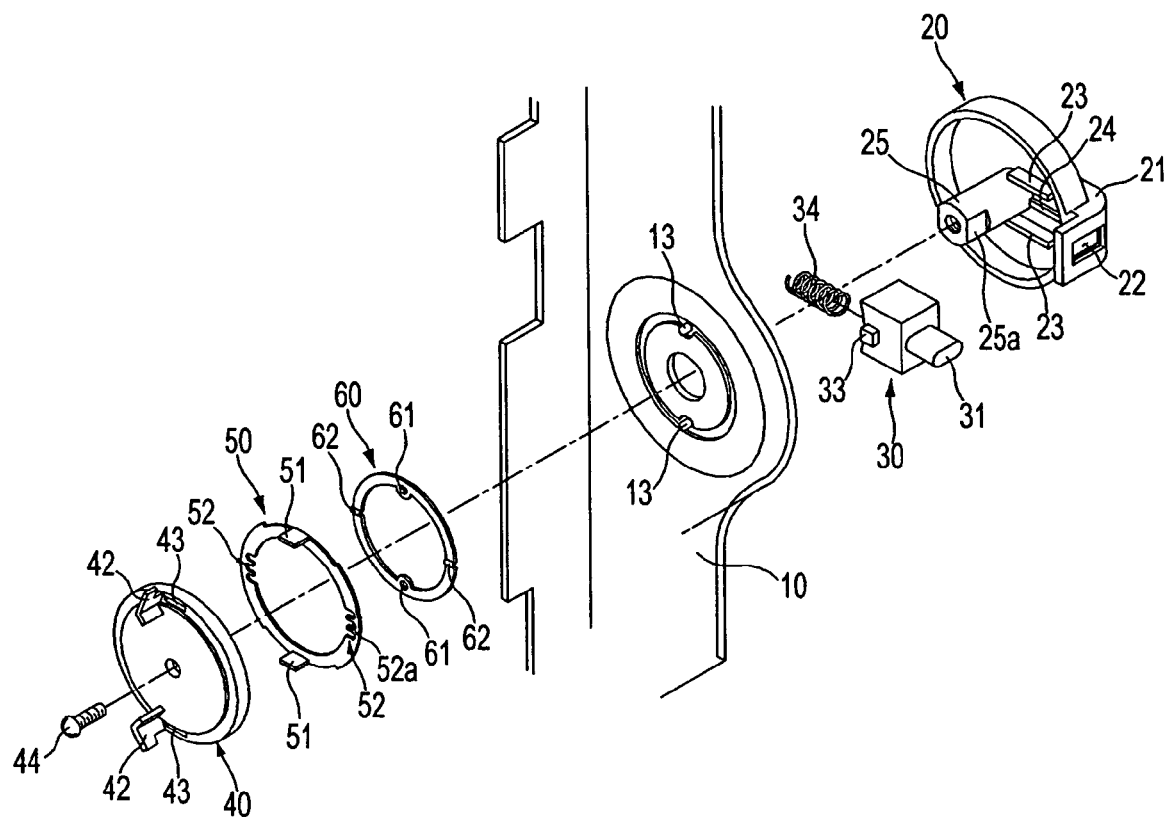
FIGS. 2 and 3 are exploded perspective views illustrating a mode-changing device for the camcorder of FIG. 1.
Figure 3:
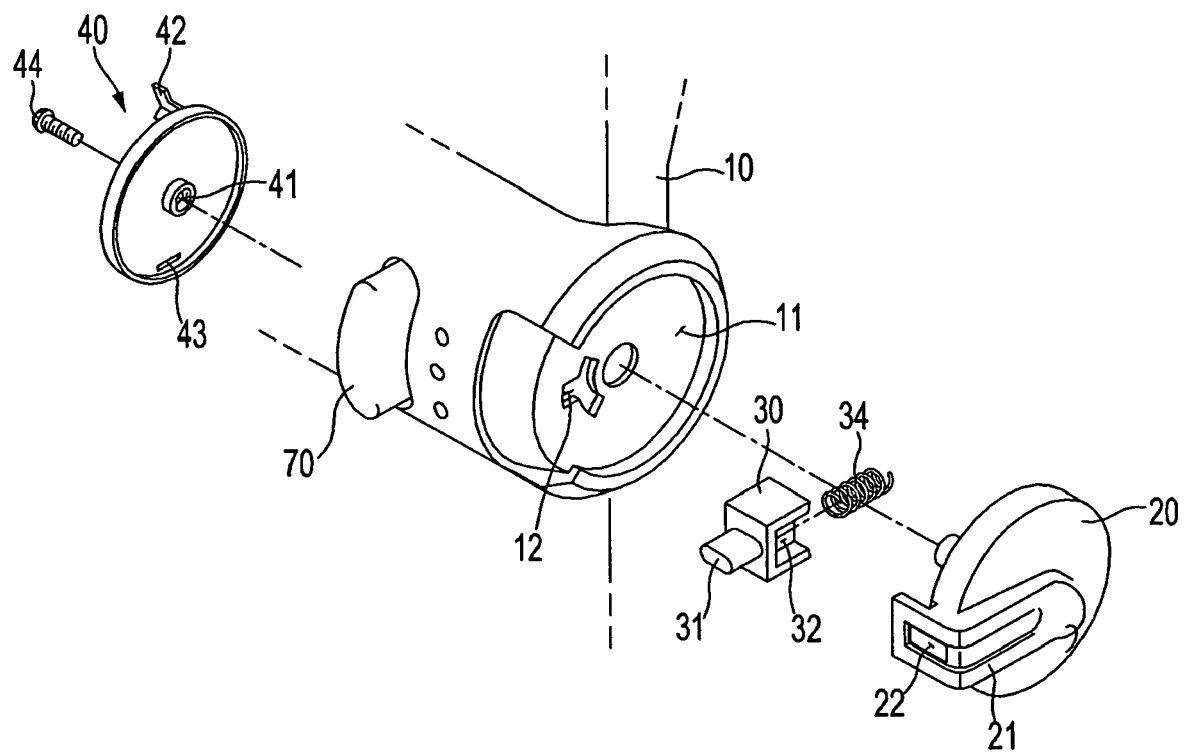

Referring to FIGS. 2-3, the knob device includes a knob 20 rotatably installed on the case 10. A locker 30 is movable forward and backward in the radial direction of the knob 20 to restrain the rotation of the knob 20. The case 10 has an accommodating recess 11 to accommodate and surround a part of the outer circumference of the knob 20. The knob preferably has a substantially annular-shaped appearance and includes a grip 21. The grip 21 protrudes backward so that a force may be easily applied thereto when manipulating the knob 20. The locker 30 has a pressing protrusion 31 that is installed on the inside of the knob 20. A portion of the pressing protrusion 31 protrudes from the knob 20 through the grip 21 so that a user may press the pressing protrusion 31. The grip 21 has a protrusion hole 22 through which the pressing protrusion 31 extends through the knob 20. The knob 20 includes guide rails 23 formed on inner surfaces to guide the movement of the locker 30. A locker spring 34 is installed between the locker 30 and the knob 20 to provide a restoring force to the locker 30 so that the locker 30 returns to a position outside of the knob 20. The locker 30 has a recess 32 for accommodating the locker spring 34. The knob 20 includes a support 24 for supporting the locker spring 34. The locker spring 34 is preferably a compression coil spring. The locker spring 34 is relatively small and provides tactile feedback when pressing the locker 30. Thus, the knob 20 may be comparatively minimized in size. The case 10 has a guide groove 12 formed on the outer surface thereof to guide the movement of the locker 30. The locker 30 has a guide protrusion 33 inserted into the guide groove 12. The movement of the locker 30 is restricted by the guide groove 12 and the guide protrusion 33. The locker 30 rotates upward and downward at a predetermined angle together with the knob 20.

The case 10 includes a knob holder 40 that is coupled with the knob 20. The knob holder 40 holds the knob 20 so that the knob 20 is prevented from separating toward the outside of the case 10. An annular-shaped ring plate 50 is rotatably coupled with the knob holder 40. Moreover, an annular-shaped plate spring 60 is fixed to the inner surface of the case 10. The knob holder 40 has an annular-shape and is rotatably coupled with the knob 20. A cylindrical coupler 25 protrudes from the inner central portion of the knob 20 to couple the knob 20 with the knob holder 40. The coupler 25 has a cut-off plane 25a formed at the end thereof by cutting the end curved surface of the coupler 25. The knob holder 40 has an accommodating groove 41 having a shape corresponding to the shape of the end of the coupler 25. The knob 20 and the knob holder 40 are coupled with each other by fitting the coupler 25 into the accommodating groove 41. A screw 44 is inserted into the center of the knob holder 40 and facilitates coupling of the knob 20 with the knob holder 40. Since hooks are used to couple the knob 20 with the knob holder 40 in the conventional art, molds for manufacturing the knob 20 and the knob holder 40 are relatively complicated and manufacturing productivity is decreases. According to the camcorder in accordance with the exemplary embodiment of the present invention, since the coupler 25 is fitted in the accommodating groove 41 for coupling, molds for manufacturing the knob 20 and the knob holder 40 are simplified and manufacturing productivity increases.

The knob holder 40 includes two switch operators 42 that are formed at the rim of the knob holder 40. The switch operators 42 operate switches 71 and 72 provided in the camcorder. The switch operators 42 have plates for pressing the switches 71 and 72. The knob holder 40 has two coupling holes 42 formed on the rim of the knob holder 40 to fix the ring plate 50.

The ring plate 50 and the plate spring 60 provide tactile feedback during the rotation of the knob 20. Furthermore, the ring plate 50 and the plate spring 60 temporarily fix the knob 20 at a predetermined location. The ring plate 50 is made of an annular-shaped plate and has two fixtures 51 that are formed on the rim thereof. The two fixtures 51 are inserted into the coupling holes 43 of the knob holder 40. The plate spring 60 is also made of an annular-shaped plate. The case 10 has two coupling protrusions 13 formed on the inner surface of the case 10 to fix the plate spring 60. The plate spring 60 has two insertion holes 61 into which the coupling protrusions 13 are inserted. Since the ring plate 50 is rotatably coupled to the knob holder 40 and the plate spring 60 is fixed to the inner surface of the case 10, the ring plate 50 rotates relative to the plate spring 60. The plate spring 60 includes two locking swells 62 that protrude in a direction toward the ring plate 50 to provide tactile feedback during the relative rotation of the ring plate 50. The ring plate 50 has two locking parts 52 into which the locking swells 62 are inserted and locked. The locking parts 52 have, respectively, three holes 52a, and the locking swells 62 are locked into ones of the three holes 52a. A user senses tactile feedback during the rotation of the knob 20 when the locking swells 62 are locked into the holes 52a of the locking parts 52. Since the locking swells 62 may separate from the holes by applying a predetermined force, when the locking swells 62 are locked into the holes 52a, the knob 20 is temporarily fixed. Preferably, the ring plate 50 and the plate spring 60 are made of metal to provide a predetermined elasticity. Since the ring plate 50 and the plate spring 60 are installed on the inside of the case 10, the knob 20 may be minimized in size.

Reference numeral 70 is assigned to a recording button used in shooting mode of the camcorder.

Hereinafter, the mode changing operation of the camcorder will be described with reference to FIGS. 4A and 4B.

Figure 4A:
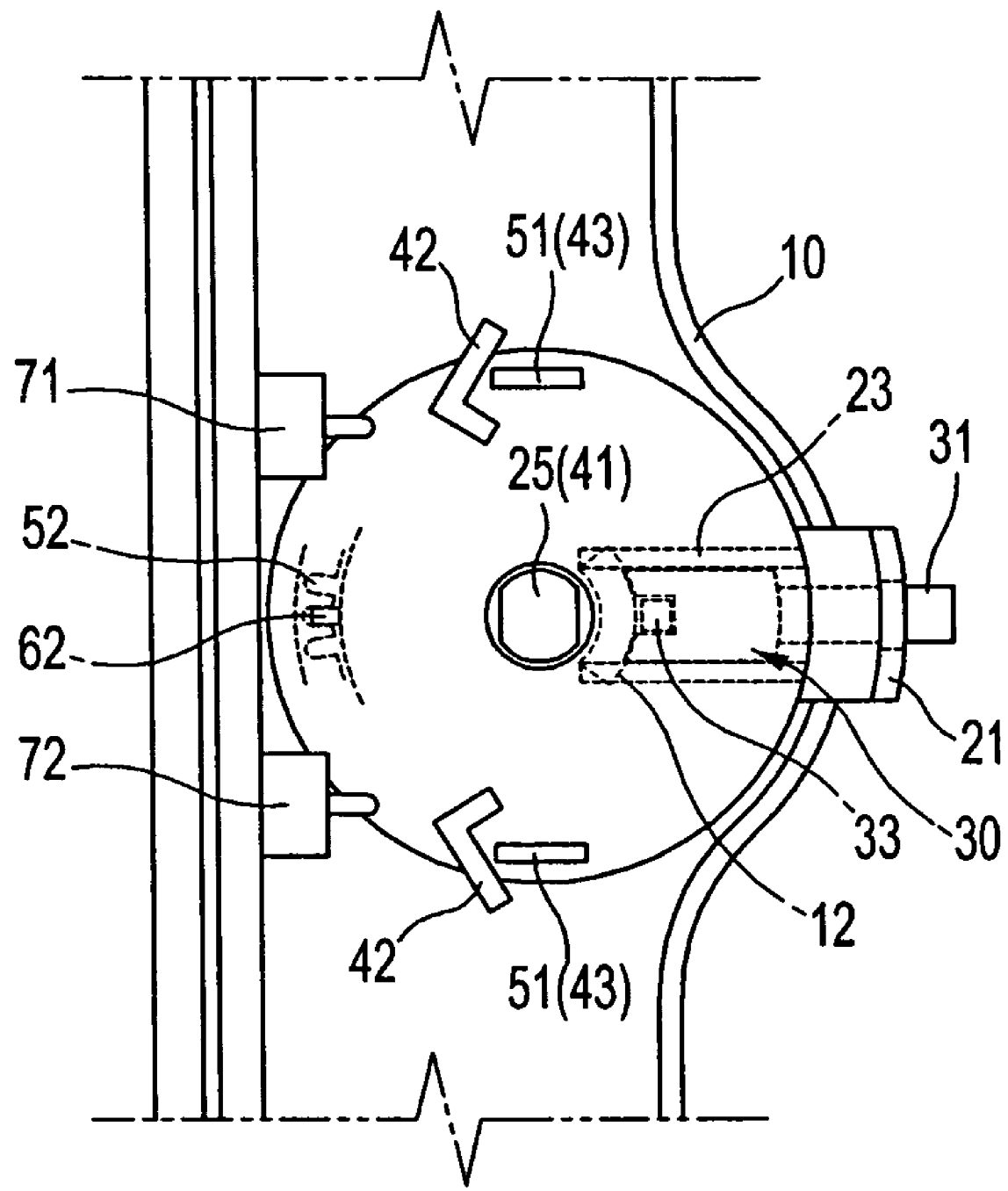
FIGS. 4A and 4B are views illustrating operation of the mode-changing device of the camcorder of FIG. 1-3.
Figure 4B:
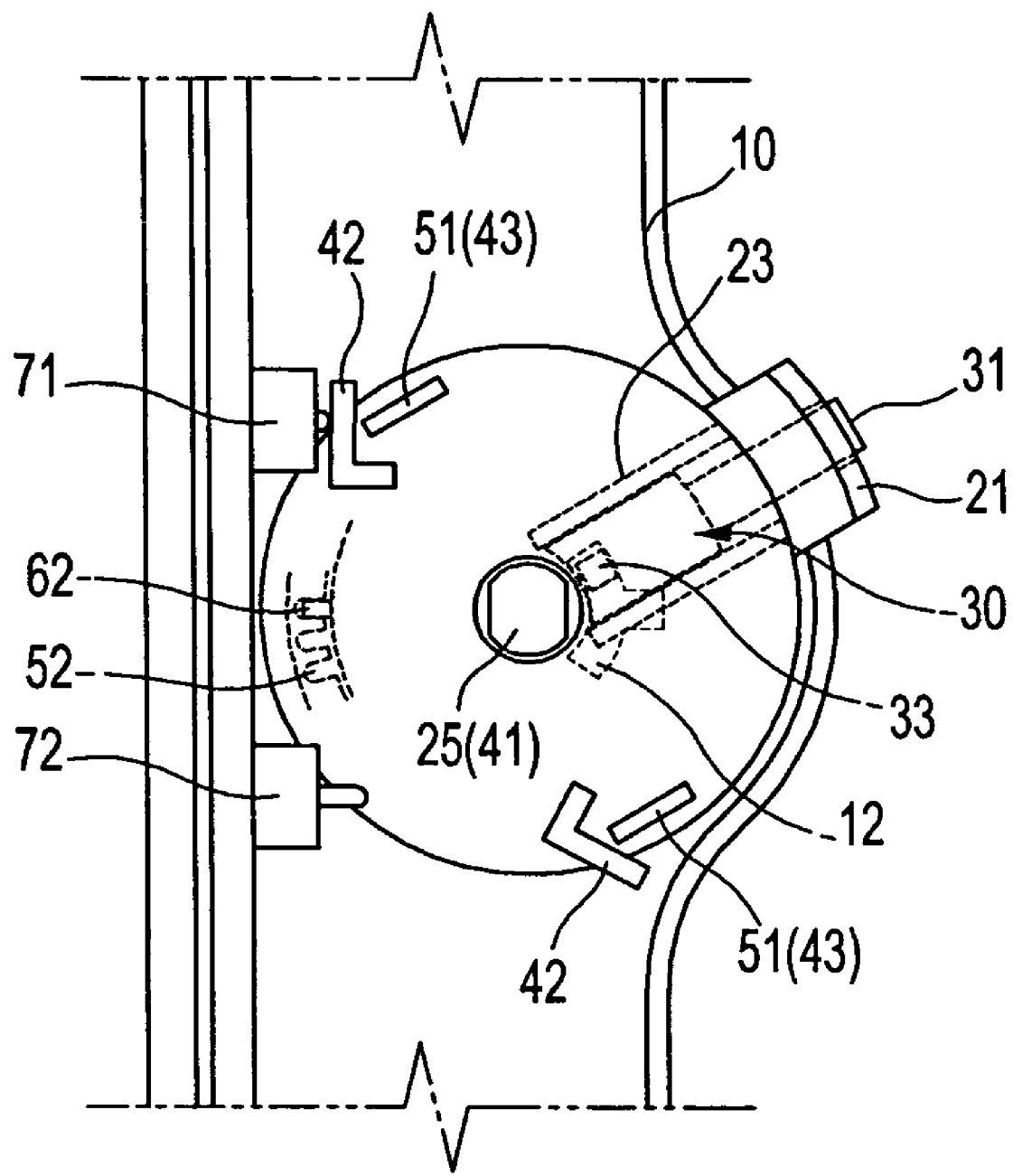

As shown in FIG. 4A, when the knob 20 is positioned at an intermediate position, the camcorder is turned off. When the grip 21 of the knob 20 is rotated in the counter-clockwise direction and moves upward, the mode of the camcorder is changed to the shooting mode. Conversely, the mode of the camcorder is changed to the reproducing mode by the clockwise rotation of the knob 20.

In more detail, when the knob 20 is positioned at the intermediate position, the locker 30 is in the state of being returned backward by the locker spring 34. At this time, the guide protrusion 33 of the locker 30 is locked by the guide groove 12 of the case 10 so that the knob 20 does not rotate. In order to rotate the knob 20, the locker 30 is pushed inward to advance the guide protrusion 33 of the locker 30 inward such that the knob 20 can be rotated. When changing the mode of the camcorder to the shooting mode, as shown in FIG. 4B, the grip 21 is pushed upward. At this time, the knob 20, the knob holder 40, and the ring plate 50 are rotated. The switching operators 42 provided at the upper side of the knob holder 40 press the shooting mode switch 71. Due to the rotation of the ring plate 50, the position of the locking parts 52, into which the locking swells 62 of the plate spring 60 are locked, is changed. Consequently, the user is provided with tactile feedback. When changing the mode of the camcorder to the reproducing mode, contrary to the case shown in FIG. 4B, the knob 20 is rotated in the reverse direction to operate the reproducing switch 72.

As described above, in accordance with the exemplary camcorder of the present invention, since components, such as the ring plate and the plate spring are installed inside the case, the size of the knob can be minimized.

Moreover, since the coupler for coupling the knob with the knob holder is fitted into the accommodating groove, the molds for manufacturing the knob and the knob holder are simplified. Thus manufacturing productivity of the camcorder increases.

Moreover, since the switching operators provided in the knob holder directly operate the switches, switching is conducted relatively smoothly.

While the invention has been shown and described with reference to certain embodiments thereof, it will be understood by those skilled in the art that various changes in form and details may be made therein without departing from the spirit and scope of the invention as defined by the appended claims.

What is claimed is:

1. A camcorder comprising:
a knob rotatably installed on a case;
a knob holder to hold the knob on the inside of the case to prevent the knob from separating from the case;
a plate spring installed inside the case and having locking swells for providing tactile feedback when the knob is rotated; and
a ring plate for rotating together with the knob holder, the ring plate having locking parts formed with a plurality of recesses into which the locking swells are locked.

2. The camcorder according to claim 1, further comprising:
a locker for restricting the rotation of the knob; and
a locker spring for returning the locker to its original position.

3. The camcorder according to claim 2, wherein
the locker comprises a pressing protrusion that is installed on the knob for moving forward and backward.

4. The camcorder according to claim 3, wherein
the locker spring comprises a compression coil spring.

5. The camcorder according to claim 1, wherein
the knob includes a coupler that protrudes from the inner central portion of the knob and couples the knob with the knob holder,
the knob holder has an accommodating groove having a shape corresponding to the shape of the coupler, and
the knob and the knob holder are coupled with each other by fitting the coupler into the accommodating groove.

6. The camcorder according to claim 1, wherein the knob holder comprises two switch operators that are provided inside the case and operate switches, and the switch operators have plates which directly contact the switches.

7. The camcorder according to claim 1, wherein the case comprises coupling protrusions that are formed in the inner surface of the case and fix the plate spring, and the plate spring has insertion holes into which the coupling protrusions are inserted.

8. A camcorder comprising:
a knob rotatably installed on a case;
a knob holder to hold the knob on the inside of the case to prevent the knob from separating from the case;
a plate spring installed inside the case and having locking swells for providing tactile feedback when the knob is rotated;
a ring plate for rotating together with the knob holder, the ring plate having locking parts formed with a plurality of recesses into which the locking swells are locked; and
a locker for restricting the rotation of the knob.

9. The camcorder according to claim 8, further comprising:
a locker spring for returning the locker to its original position.

10. The camcorder according to claim 9, wherein
the locker comprises a pressing protrusion that is installed on the knob for moving forward and backward.

11. The camcorder according to claim 10, wherein
the locker spring comprises a compression coil spring.

12. The camcorder according to claim 8, wherein
the knob comprises a coupler that protrudes from the inner central portion of the knob and couples the knob with the knob holder,
the knob holder has an accommodating groove having a shape corresponding to the shape of the coupler, and
the knob and the knob holder are coupled with each other by fitting the coupler into the accommodating groove.

13. The camcorder according to claim 8, wherein the knob holder comprises two switch operators that are provided inside the case and operate switches, and the switch operators have plates which directly contact the switches.

14. The camcorder according to claim 8, wherein the case comprises coupling protrusions that are formed in the inner surface of the case and fix the plate spring, and the plate spring has insertion holes into which the coupling protrusions are inserted.

15. A camcorder comprising:
a knob rotatably installed on a case;
a knob holder to hold the knob on the inside of the case to prevent the knob from separating from the case, the knob holder includes two switch operators that are provided inside the case to operate switches;
a plate spring installed inside the case and having locking swells for providing tactile feedback;
a ring plate for rotating together with the knob holder, the ring plate having locking parts formed with a plurality of holes into which the locking swells are locked; and
a locker for restricting the rotation of the knob, the locker includes a pressing protrusion that is installed on the knob for moving forward and backward.

16. The camcorder according to claim 15, further comprising:
a locker spring for returning the locker to its original position.

17. The camcorder according to claim 16, wherein
the locker spring includes a compression coil spring.

18. The camcorder according to claim 15, wherein
the knob includes a coupler that protrudes from the inner central portion of the knob and couples the knob with the knob holder,
the knob holder has an accommodating groove having a shape corresponding to the shape of the coupler, and
the knob and the knob holder are coupled with each other by fitting the coupler into the accommodating groove.

19. The camcorder according to claim 15, wherein
the switch operators have plates which directly contact the switches.

20. The camcorder according to claim 15, wherein the case includes coupling protrusions that are formed in the inner surface of the case and fix the plate spring, and the plate spring has insertion holes into which the coupling protrusions are inserted.

* * * * *